United States Patent [19]

Water

[11] Patent Number: 4,778,344
[45] Date of Patent: Oct. 18, 1988

[54] VARIABLE PITCH MECHANISMS

[76] Inventor: Abraham Water, 16 Cliff Road, Torbay, Auckland, New Zealand

[21] Appl. No.: 909,880

[22] Filed: Sep. 22, 1986

[30] Foreign Application Priority Data

Sep. 20, 1985 [NZ] New Zealand .......................... 213568

[51] Int. Cl.⁴ ........................ B64C 11/20; B64C 11/44
[52] U.S. Cl. .................................... 416/239; 416/155; 416/167
[58] Field of Search ............... 416/165, 155, 167, 205, 416/239

[56] References Cited

U.S. PATENT DOCUMENTS

| Re. 18,957 | 9/1933 | Gobereau et al. | |
|---|---|---|---|
| 12,665 | 6/1854 | Perkins . | |
| 15,638 | 6/1856 | Parker . | |
| 642,601 | 2/1900 | Gere . | |
| 769,256 | 9/1904 | Enge . | |
| 861,612 | 7/1907 | Shultz . | |
| 1,374,786 | 4/1921 | Walker | 416/155 |
| 1,404,269 | 1/1922 | Caldwell . | |
| 1,425,922 | 8/1922 | Wesnigk . | |
| 1,620,968 | 3/1927 | Heath | 416/205 |
| 1,722,182 | 7/1929 | Taylor . | |
| 1,747,230 | 2/1930 | Duprey | 416/155 |
| 1,773,550 | 8/1930 | Scott . | |
| 1,810,159 | 6/1931 | Carol . | |
| 1,837,318 | 12/1931 | Eustis | 416/205 |
| 1,877,821 | 9/1932 | Covey | 416/165 |
| 1,915,465 | 6/1933 | Kohlstedt . | |
| 2,054,810 | 9/1936 | Gaba | 416/165 X |
| 2,118,652 | 5/1938 | Meijer . | |
| 2,118,653 | 5/1938 | Meijer . | |
| 2,127,264 | 8/1938 | Lampton . | |
| 2,223,081 | 11/1940 | Thomas . | |
| 2,297,142 | 9/1942 | German | 416/239 X |
| 2,370,135 | 2/1945 | Berliner . | |
| 2,443,239 | 6/1948 | Greenwood | 416/205 |
| 2,474,635 | 6/1949 | Nichols . | |
| 2,595,231 | 5/1952 | Dermond . | |
| 2,792,897 | 5/1957 | Dagrell | 416/165 |
| 3,130,677 | 4/1964 | Liebhart | 417/336 |

FOREIGN PATENT DOCUMENTS

| 544926 | 8/1957 | Canada | 416/167 |
|---|---|---|---|
| 3406634 | 8/1985 | Fed. Rep. of Germany | 416/165 |
| 1095464 | 6/1955 | France | 416/167 |
| 703458 | 2/1954 | United Kingdom | 416/165 |
| 822469 | 10/1959 | United Kingdom | 416/165 |
| 860205 | 2/1961 | United Kingdom | 416/165 |

Primary Examiner—Everette A. Powell, Jr.
Attorney, Agent, or Firm—Holman & Stern

[57] ABSTRACT

A variable pitch mechanism for a propeller comprises a crank pin on each rotatable blade of a propeller, or fan impeller, rotatable about a longitudinal axis thereof, a translational member having a crank pin engagement element for each crank pin, an actuating device connected to the translational member for causing the translational member to be moved in a desired direction resulting in movement of each crank pin means to cause each blade to rotate on its longitudinal axis in unison with and in the same sense as the other blade or blades of the propeller or fan impeller to cause variation in pitch of the blades. The propeller blade root assembly may have a housing, a blade root mounting rotatable about the longitudinal axis of the blade in the housing, an end cap fixed to the blade root mounting and having a thrust bearing engaging the housing to resist centrifugal force acting on the blade. The blade root may have transverse slots extending axially at right angles, a sleeve screwed onto the blade root, and a tapered bolt screwed into the end of the blade root on the axial centerline thereof to compress the root onto the inner screwed surface of the sleeve, the tapered bolt being fixed to the end cap.

3 Claims, 3 Drawing Sheets

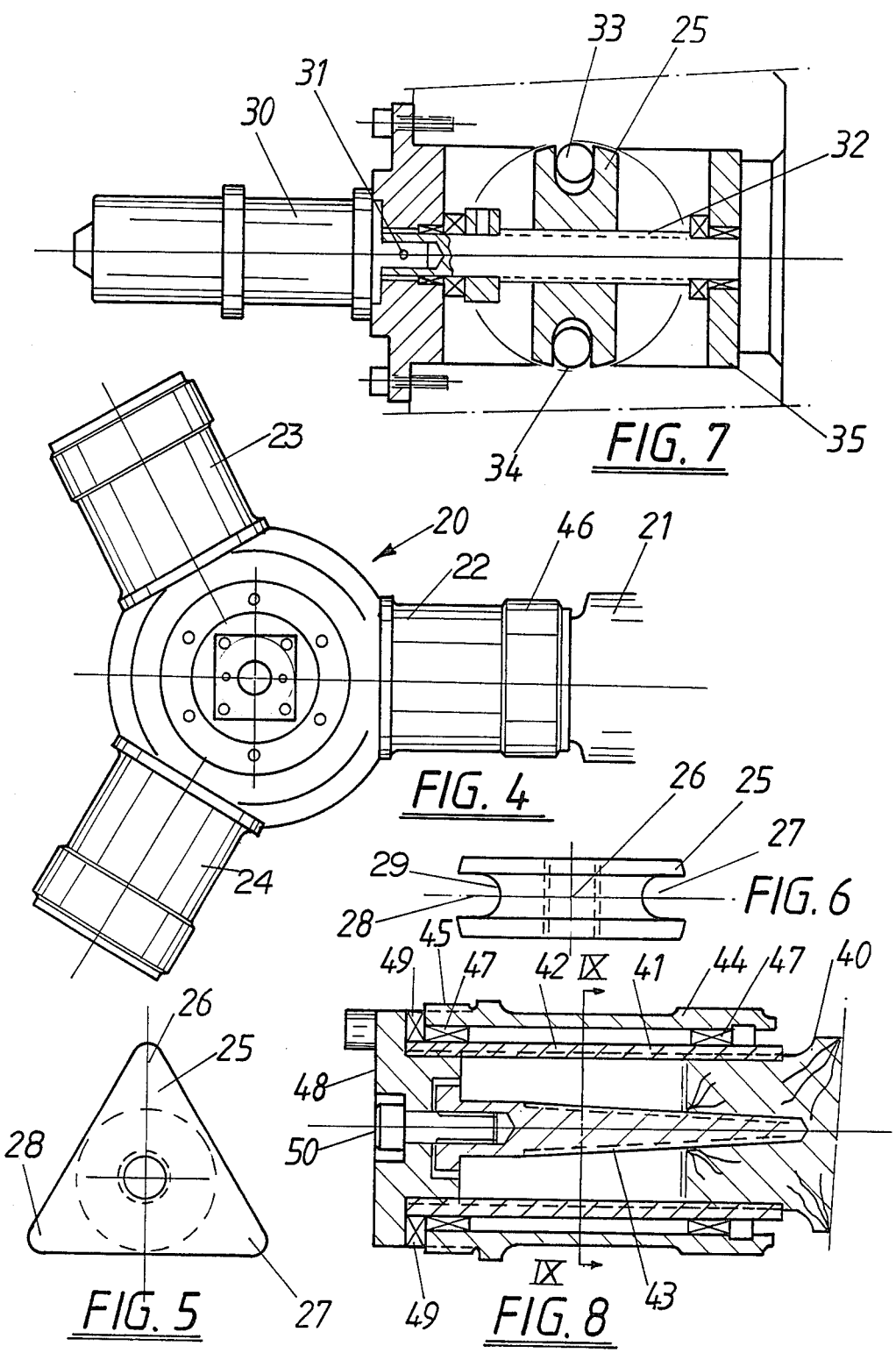

VARIABLE PITCH MECHANISMS

BACKGROUND OF THE INVENTION

1. Field of the Invention

This invention relates to variable pitch mechanisms and/or propellers including such mechanisms and has been devised particularly though not solely for use in propellor driven aircraft.

2. Description of the Prior Art

Fan impellers, ground-adjustable propellers and flight-adjustable propellers are used on air-driven vehicles, wind-generating plants and windmills used for driving machinery, generating electricity and effecting irrigation, conducted fans and air conditioning systems. A propeller or fan impeller is a device having, or for mounting on, a revolving shaft with blades set at an angle to propel air in a desired axial direction. Ground-adjustable means for regulating the pitch of the blades are provided when the shaft is stationary, and flight-adjustable means for regulating the pitch of the blades are provided when the shaft is rotating and airborne.

In the prior art, with two or more bladed ground-adjustable propellers, the blades are individually retained in the hub and stopped from rotating around their longitudinal axes by means of a clamping device in the hub or due to an interference fit in the hub itself. To change pitch the clamping device or propeller halves have to be unlocked and the blades then adjusted. Each blade has to be set individually to the required pitch, the pitch setting checked by means of a visual reference, and the propeller hub then clamped up again. Pitch settings are generally done in the field and require considerable skill. A difference of one degree pitch setting between two blades can introduce unpleasant vibrations.

BRIEF SUMMARY OF THE INVENTION

It is an object of the present invention to provide a variable pitch mechanism and/or a propeller or fan impeller including such mechanism which overcomes problems in such prior known mechanisms.

Accordingly in one aspect the invention may broadly be said to consist in a variable pitch mechanism comprising a crank pin means for each rotatable blade of a propeller or fan impeller rotatable on a longitudinal axis thereof in which the mechanism is to be fitted, a translational member having a crank pin means engagement means for each crank pin means and actuating means connected to said translational means to cause the translational means to be moved in a desired direction resulting in movement of each crank pin means to cause each blade to rotate on the longitudinal axis in unison with and in the same sense as the other blade or blades of the propeller or fan impeller to cause variation in pitch of the blades.

In a further aspect the invention consists in a propeller blade root assembly comprising a housing, a blade root mounting rotatable on the longitudinal axis of the blade in the housing, a cap fixed to the blade root for mounting and having thrust means bearing on the housing to resist centrifugal force acting on the blade.

In accordance with the present invention all the blades of a multi-bladed propeller are interconnected by means of a translational means which is preferably a slide and a crank pin means on each blade. The crank pin means preferably comprise a pin on the base of the inner end of each blade, each blade being rotatable in the clamping device above referred to, but if desired the crank pin means may comprise an aperture in the base of the blade with a pin on the translational means as will be further described below.

To those skilled in the art to which the invention relates, many changes in construction and widely differing embodiments and applications of the invention will suggest themselves without departing from the scope of the invention as defined in the appended claims. The disclosure and description herein are purely illustrative and are not intended to be in any sense limiting.

BRIEF DESCRIPTION OF THE DRAWINGS

One preferred form of the invention will now be described with reference to the accompanying drawings wherein:

FIG. 4 is an elevational view of a three bladed propeller boss;

FIG. 5 is a plan view of a sliding member for use in the boss;

FIG. 6 is a side view of the sliding member of FIG. 5;

FIG. 7 is a diagrammatic cross-sectional view of a motorized mechanism according to the invention;

FIG. 8 is a cross sectional view of a propeller blade root holding mechanism in accordance with the invention.

Figure 1:
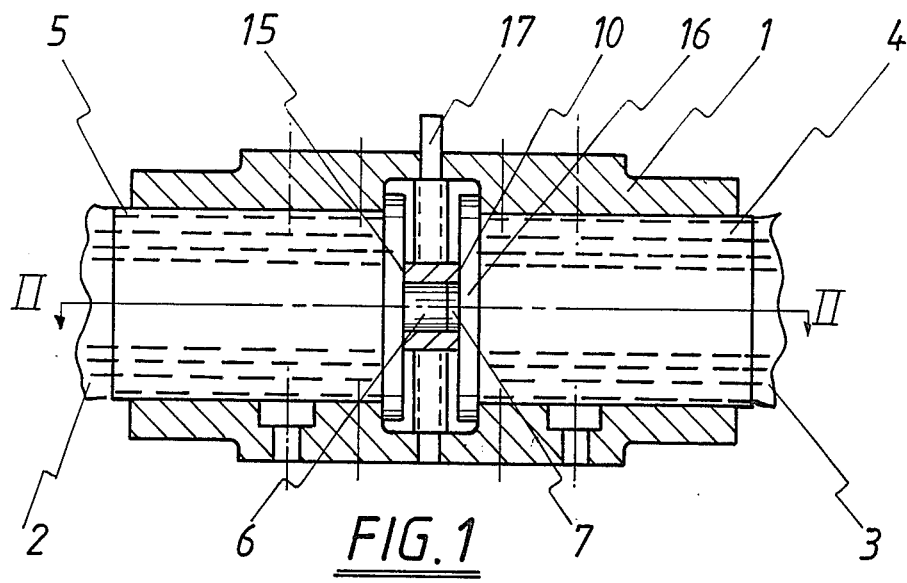
FIG. 1 is a cross sectional view of the hub of a propeller incorporating a variable pitch mechanism according to the invention.
Figure 2:
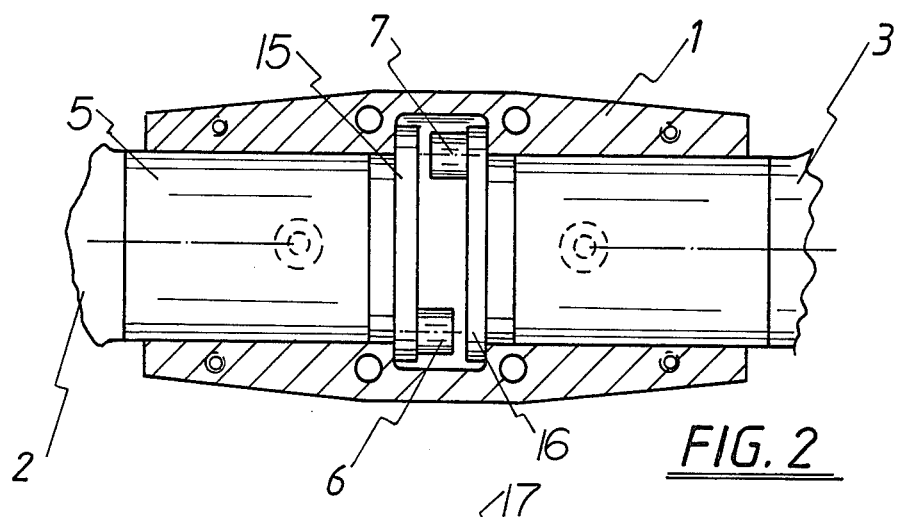
FIG. 2 is a cross-sectional view taken along line II—II in FIG. 1 with parts so removed for clarity.
Figure 3:
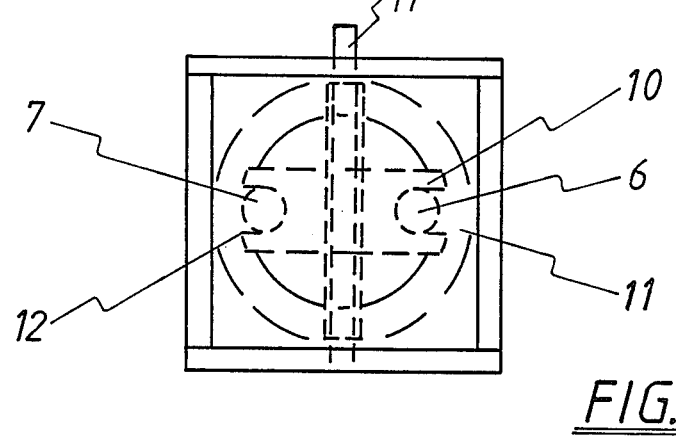
FIG. 3 is a schematic end view of the construction shown in FIG. 1.
Figure 9:
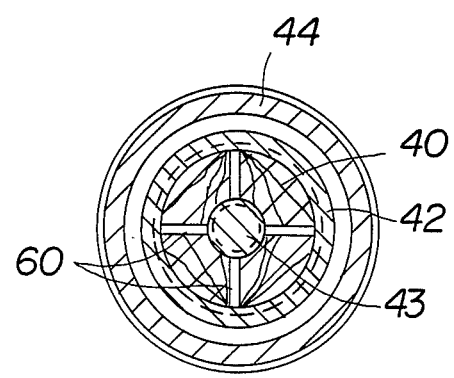
FIG. 9 is a cross-sectional view taken along line IX—IX of FIG. 8.

One preferred form of the invention in which the hub of a two bladed propeller is shown includes a boss 1 in which two blades 2 and 3 are clamped, the blades 2 and 3 having cylindrical ends 4 and 5 fitting in co-acting surfaces of the hub 1. Each blade is provided with a crank pin means and preferably the crank pin means comprises a crank pin 6 on the blade 2 and a crank pin 7 on the blade 3. As stated above the crank pin means may comprise an aperture in the base of each blade and a pin provided on a slide member 10 seen more particularly in FIGS. 1 and 3. Such slide member 10 is provided with crank pin engaging means comprising slots 11 and 12 engaging, respectively, the pins 6 and 7. As may be seen in FIG. 1, the slide 10 is disposed between the opposite base faces 15 and 16 of the propeller blades and consequently the pin 6 is on one side of the slide and the pin 7 is on the other side of the slide 10. Also the pins 6 and 7 are at opposite ends of a diametral line. As a result of this arrangement, if the slide is moved by an actuating mechanism which preferably comprises a screw 17 the pins 6 and 7 will both be moved in the same direction and thus will vary the pitch of the blades 2 and 3 relative to the hub 1 in the same sense, that is to say the leading edge of each blade will be moved for example forwardly in the direction of air flow by rotation of the screw 17 in one direction and opposite to the direction of air flow if the screw is rotated in the opposite direction. In this way pitch variation can be quickly and easily affected.

The use of the invention will be clear from the foregoing. The operator unclamps the blades, rotates the screw 17 in the desired direction and a virtual micrometer effect can be obtained giving very precise adjustment of the pitch of the blades. After adjusting the pitch, the blades are reclamped and the clamping nuts are retorqued and locked.

Where a propeller has three or more blades, then the translational means will need to have a series of faces each parallel to the base of the boss of each blade, each such face including a crank pin and the translational means will be required to be actuated by actuating means moving the translational means in the direction of, or parallel to, the direction of air flow to achieve the same results.

Thus, referring to FIGS. 4 to 6 a three bladed propeller 20 has three blades 21 in sockets 22, 23 and 24. A slide 25, similar to slide 10 but of equilateral triangular formation, is provided and to provide the slots 26, 27 and 28 a continuous groove having a circular base 29 is provided and the slots 26, 27 and 28 engage crank pins on the bases of the blades (not shown) which rotate the blades 21 by translational movement of the slide 25 in the direction of, or parallel to, the air flow as described above.

Where it is desired to provide a flight adjustable actuating means the blades are retained in bearing and are free to rotate in the propeller hub. The overriding forces are the centrifugal load and consequently the main bearing is the centrifugal thrust bearing. A secondary load is the propeller thrust load which results in axial bending of the blade but is generally only 4% of the centrifugal load. A third load is the tangential acceleration of each individual blade due to the lag angle of the blades. The resultant load has a tendency to move the blades to fine pitch which has to be counteracted by pitch change control input. To reduce this load with state of the art propellers, counterweights are generally fitted at the roots of the blades. In the present design, because of the use of a powerful DC electric motor with reduction gearbox, the possible control input is 300% higher and it is not necessary to fit counterweights. However to reduce the tangential acceleration the blades according to the present invention can be fitted at an angle which coincides with the lag angle thereby reducing the twisting movement acting on the blades. As stated above blades are interconnected through translational means preferably being a central slide and this slide can be operated during the operation by an electric motor.

Thus, referring to FIG. 7 an electric motor 30 has a reduction gear driving shaft 31 which under operation control rotates screw member 32, which corresponds to screw 17, so that the pins 33 and 34 is appropriate blade bosses will be moved as above described by engagement in the slots 27 and 28, if applied to the propeller 20 of FIG. 7. A slip ring 35, or slip rings, are provided to conduct power to the motor.

An aircraft engine is usually lubricated with lubricating oil under pressure and such pressure is used to operate the variable pitch mechanism. Two O rings are slipped over the crank shaft and engine oil is passed through a governor for admission through the crank shaft to the propeller hub. The oil pressure required is dependent on a particular flight condition and spring pressure is provided which tends to return the propeller to fine pitch. Engine RPM, leak rate across the oil seals around the crank shaft and engine oil pressure dictate the amount of oil the governor admits to the propeller to maintain the blades at the required pitch.

In application, the position of the blades determines the loading or power output of the engine at full throttle. During take off and transition to flight, the load on the propeller varies and to obtain maximum performance the propeller has to operate in the fine pitch and after take off increase pitch as air speed builds up. The loading of the propeller on the engine governs the engine RPM and manifold pressure and these are controlled. In order to effect control use is made of an electronic device which is often fitted in cars as a cruise controller. The engine RPM and manifold pressure are fed into a computer forming part of the control and this controls the geared down electric motor and jack screw. Any deviation from the preset RPM and manifold pressure will result in an adjustment of the electric motor and consequently the pitch of the propeller blades. Operating in this mode the engine can be set at full throttle during take off and the pitch control mechanism will govern RPM and manifold pressure automatically.

As stated above the main load acting on a propeller blade is the centrifugal load and this is a linear function of the blade weight and the square function of engine RPM. In the case of aluminum alloy blades, each blade is retained in the housing by a boss machined at the root end of the blades. If propeller blades are made of laminated wood, on a small propeller it is possible to rely on a boss machined at the end of the blade provided the size and diameter of the boss can handle the resulting compressive and shear loads. on larger propellers it is essential to fit a metal sleeve to the blade which in turn fits into the hub housing. Either the sleeve has a tapered internal screw thread and is screwed into the blade shank, or the sleeve is retained with dowel pins or wood or cap screws are screwed into the end of the blade shank to retain the sleeve.

In the preferred form, and referring to FIG. 8, a propeller blade root 40 has two diametral saw cuts 60 mutually at right angles each terminating in a drilled hole such as hole 41 to restrict further splitting. A steel sleeve 42 has an internal thread e.g. 2 mm high, 2 mm wide of buttress formation at 3.5 TPI and the sleeve is screwed onto the exterior of the root. A tapered bolt 43 of 6 TPI thread of similar shape is screwed axially into the root. The root 40 fits in a housing 44, is screw threaded at 45, and is adapted to fit on bearings 47. An end cap 48 bears against a thrust bearing 49 which in turn bears against housing 44 and a cap screw 50 engages the outer end of bolt 43. Thus, the centrifugal load on the blade is resisted both by the cap 48 engaging the housing 44 and by the cap screw engaging the tapered bolt 43. The cutting of the root 40 into quarters and the insertion of the tapered bolt 43 expands the material (usually wood) of the blade into the screw thread of the sleeve 42 to give satisfactory blade retaining means in a standard form construction without the necessity to provide separate sockets for each propeller.

A further advantage is that the blade assembly components are easily removable for maintenance or disassembly.

I claim:

1. A variable pitch mechanism for rotatable blades of a propeller comprising:
    a hub having a central axis of rotation and at least two radially extending cylindrical propeller blade mounting holes therein;

a central cavity in said hub communicating with the radially inner ends of said propeller blade mounting holes;

at least two propeller blades each having a longitudinal axis extending at right angles to said central axis of rotation of said hub;

a root end on each propeller blade having a cylindrical outer surface rotatable mounted in a respective one of said propeller blade mounting holes;

diametral slits in said root end at right angles to each other and passing through said longitudinal axis to allow radial expansion of said root end;

a cylindrical sleeve surrounding said root end;

an internal screw thread on said sleeve for screwing said sleeve onto said root end;

a tapered screw-threaded bolt screwed axially into said root end at the intersection of said slits for expanding said root end;

an end cap on the radially inner end of said root end;

an axially extending screw-threaded hole in said tapered bolt;

screw means for securely and non-rotatably attaching said end cap to said root end by engaging in said screw-threaded hole;

a radially extending flange on said end cap;

thrust bearing means between said flange and said hub for supporting radially outward thrust due to centrifugal force on said propeller blade;

a crank pin extending radially inwardly relative to said central axis of rotation from each end cap and offset radially relative to said longitudinal axis of the respective propeller blade;

a slide member movably mounted in said central cavity for transverse movement relative to said longitudinal axes of said at least two propeller blades;

slot means in said slide member operatively slidably engaging each crank pin;

actuating means operatively engaging said slide member for producing said transverse movement of said slide member; and electric motor means connected to said actuating means for operating said actuating means to move said slide member and rotate said propeller blades to vary the pitch thereof.

2. A variable pitch mechanism as claimed in claim 1 wherein said propeller blades are wooden propeller blades.

3. A variable pitch mechanism as claimed in claim 1 wherein:

said at least two propeller blades comprises three propeller blades;

said slide member has an equilateral triangular configuration; and said slot means comprises a circular groove having in cross-section a substantially semi-circular base and a central axis substantially coinciding with the geometric center of said triangular slide member.

* * * * *